United States Patent [19]

Macovski

[11] Patent Number: 5,077,603
[45] Date of Patent: Dec. 31, 1991

[54] BANDWIDTH EXTENDING SYSTEM FOR COLOR DIFFERENCE SIGNALS

[76] Inventor: Albert Macovski, 2505 Alpine Rd., Menlo Park, Calif. 94025

[21] Appl. No.: 542,063

[22] Filed: Jun. 22, 1990

[51] Int. Cl.⁵ .................... H04N 9/64; H04N 5/14; H04N 5/208
[52] U.S. Cl. ........................ 358/37; 358/166
[58] Field of Search ..................... 358/37, 166

[56] References Cited

U.S. PATENT DOCUMENTS

| | | | |
|---|---|---|---|
| 4,030,121 | 6/1977 | Faroudja | 358/37 |
| 4,316,215 | 2/1982 | Yasumoto et al. | 358/166 |
| 4,337,479 | 6/1982 | Tomimoto et al. | 358/37 |
| 4,400,721 | 8/1983 | Macovski | 358/37 |
| 4,541,014 | 10/1985 | Yagi | 358/37 |
| 4,980,755 | 12/1990 | Ozaki | 358/37 |

FOREIGN PATENT DOCUMENTS

| | | | |
|---|---|---|---|
| 5120290 | 9/1980 | Japan | 358/37 |
| 5121787 | 9/1980 | Japan | 358/37 |
| 5137787 | 10/1980 | Japan | 358/57 |
| 5154892 | 12/1980 | Japan | 358/37 |
| 5154893 | 12/1980 | Japan | 358/37 |

Primary Examiner—Howard W. Britton
Assistant Examiner—Wendy R. Greening

[57] ABSTRACT

The response of color television are improved by adding a high frequency luminance component which is proportioned to the color-difference signal so as to provide color signals with correct transitions. A control function which minimizes the means square error of the luminance and color difference signals is used to weight the amplitude of the added luminance component. This control function becomes the ratio of the cross correlation of the luminance and color-difference signals to the autocorrelation of the luminance signal. In a television communications system, the control signal can be transmitted as a narrow band signal.

10 Claims, 2 Drawing Sheets

FIG.−1

BANDWIDTH EXTENDING SYSTEM FOR COLOR DIFFERENCE SIGNALS

BACKGROUND OF THE INVENTION

1. Field of the Invention

This invention relates to color television receivers. In a primary application it relates to receivers using color television systems having reduced chrominance bandwidth with the associated poor transient response at color edges. 2. Description of the Prior Art The present commercial broadcast color television system, in both the United States and other countries, employs a reduced chrominance bandwidth and wide luminance bandwidth for overall bandwidth conservation. This color system makes use of the reduced accuity of human vision to color difference signals. It is described in a paper by A. V. Bedord, "Mixed Highs in Color Television," *Proceedings IRE*, Vol. 38, No. 9, p. 1003, September 1950. The system is called the "mixed highs" system since the high frequency luminance information is applied equally to each color channel. Unfortunately this approach often results in distorted color edges. For example, in a transition region, a specific color can be increasing while the applied luminance transition information can be of the opposite polarity. Similarly, a luminance transition can be applied to a color signal which is not changing.

In previous U.S. patents including Richman U.S. Pat. No. 4,400,721; Yasumoto et al. U.S. Pat. No. 4,316,215 and Macovski U.S. Pat. No. 4,181,917; methods were shown for adding controlled amounts of high frequency luminance signals to the color difference signals. These methods generally developed control signal by taking ratios of derivatives of the signals, resulting in unstable or noisy performance, especially in regions where the derivatives of the luminance signal was relative low.

In a somewhat related application by the same inventor a method is shown for reducing the noise of a desired signal using a correlated signal having better signal-to-noise ratio. Here an estimated signal is found having the low frequencies from the desired signal and the high frequencies from the correlated signal. The amount of high frequencies is determined by the ratio of the cross correlation of the two signals to the autocorrelation of the correlated signal.

In addition to the color transition problem of existing television receivers, great interest has been generated recently in formulating high-definition television systems which are compatible with existing receivers. These new standards add information at the transmitter which is used at the new high-definition receiver to increase the resolution. It is most desirable that the added information be of relatively low bandwidth so that it can fit into existing television channels.

SUMMARY OF THE INVENTION

An object of this invention is to provide a system for improving the transient response and picture quality of color television receivers.

A further object of this invention is to provide a method of supplying the correct transition amplitudes and polarities to color television signals.

A further object of this invention is to provide a method of increased color resolution for compatible high-definition color television receivers.

Briefly, in accordance with this invention, a controlled amount of high frequency luminance information is added to each color-difference signal. The amount is determined by correlating the luminance and color difference signals. In existing systems the ratio of the cross correlation of bandlimited luminance and color difference signals to the autocorrelation of the bandlimited luminance signal is used to control the amount of high frequency luminance signal added to the color difference signal. In high-definition systems this ratio is taken at the transmitter, with full bandwidth signals, and transmitted to the receiver using subarrier modulation.

BRIEF DESCRIPTION OF THE DRAWINGS

For a more complete disclosure of the invention reference may be made to the following detailed description of several illustrated embodiments thereof which are given in conjunction with the accompanying drawings, of which.

DESCRIPTION OF THE PREFERRED EMBODIMENT

In the current practiced system of color television receivers the high frequency luminance information added to the color signals is of somewhat arbitrary amplitude and polarity. It is applied equally to each color channel whether the transition in that channel are positive, negative, or zero. This often results in distorted edges and seriously limits the picture quality of the reproduced color images. In this invention, use is made of the very high correlation between the color signals and the luminance signals. Therefore the color difference signals themselves can be used to determine the correct amplitude and polarity of the luminance transition information. This provides a much improved color image with no associated increase in bandwidth.

In the present system, as indicated, the added high-frequency luminance information can be in error since it can and often does have the wrong amplitude and/or polarity. In this invention the error is minimized by comparing the luminance and chrominance high frequencies and adding an amount of luminance high-frequency information which minimizes the error between the two high frequency signals. In one embodiment this is accomplished by minimizing the square of the difference between the color difference high frequencies and a constant "C" times the luminance high frequencies. This is averaged over a few picture elements. The resultant constant reveals how much and what polarity of luminance high frequencies to add to the color difference signal to minimize the error of the resultant signal. The final minimum error signal is thus the band-limited color difference signal, such as (R-Y), plus "C" times the luminance high frequencies in each local region.

Improvement in the image quality of color television displays is clearly more important than ever. Large screen displays are being used in projection systems in addition to other improved display devices. In these larger formats the edge distortions, especially in high saturation color regions, represents the most serious deterioration of the image. This invention dramatically improves the fidelity of these images without changing the bandwidth or the system standards.

The distortion in present system can clearly be seen when colored lettering is displayed. The horizontal bars such as those in the letters E and L, have normal saturation and crisp outlines. The vertical bars, however, experience soft edges and severe desaturation resulting in a very unsatisfactory, difficult to read, display.

Over and above the improvement of existing television receivers through increased color bandwidth, this invention also addresses the newer high-definition television receivers which have been proposed. These HDTV receivers can use the basic invention in the same form. However, they can also use a modified form, to be described using FIGS. 2 and 3, which add information to the transmitted signal.

Figure 1:
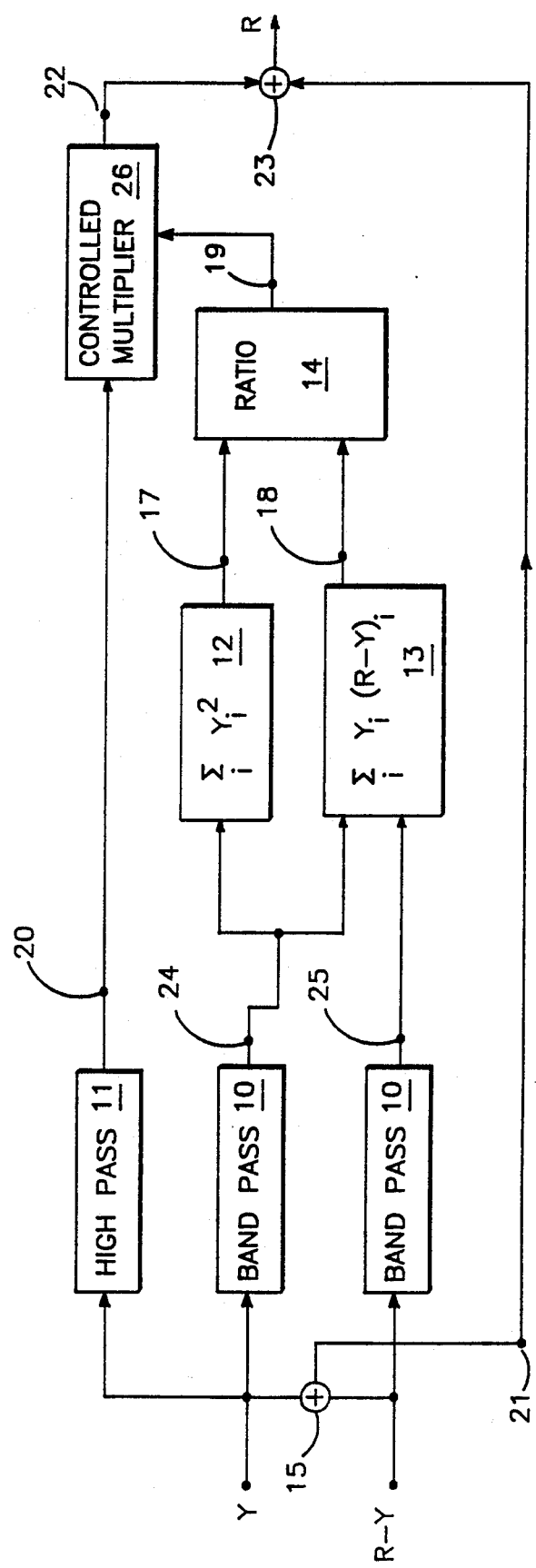
FIG. 1 is a block diagram of an embodiment of the invention.

An understanding of the broad aspects of the invention may best be had by reference to FIG. 1 of the drawings. Here, we provide an improved red signal, starting with the conventional wideband Y signal and narrowband R-Y signal derived from the composite video signal at the receiver. The exact same block diagram would also be used with B-Y and G-Y to derive improved blue and green signals.

As shown the incoming Y and R-Y signals are both band-pass filtered by substantially identical filter 10. These would typically be in the 0.2–1.0 MHz range representing the higher frequency region. In cases of noisy signals, the lower frequency bound can be reduced to provide higher signal energy. It is then desired to develop a gain factor C which will minimized the error between these two signals 24 and 25 which we will call $Y^i$ and $(R-Y)^i$ respectively. One method of minimizing the error, is to minimize the mean square error $\epsilon$ as given by $$\epsilon = \Sigma[(R-Y)^i - CY^i]^2$$

where the sum is taken over an array of pixels surrounding each pixel being corrected. Setting $\epsilon$ to zero and solving the quadratic equation for C provides $$C = \frac{\Sigma Y_i(R-Y)_i}{\Sigma Y_i^2}$$

where the numerator is the cross correlation of the filtered luminance and color difference signals and the denominator is the autocorrelation of luminance signal each evaluated at each picture element. This constant C therefore represents that factor which multiples the high frequencies of Y, to recreate the color difference signal. Since the high frequency region of the various signals, 1.0–4.0 MHz, is strongly correlated to the mid-frequency region, 0.2–1.0 MHz, especially at edges, this constant represents an excellent method of determining the correct amount and polarity of high frequency luminance signal to be added to the color difference signals to provide improved edge response. In addition to being mathematcially correct, this approach is very stable, representing division by a number which is always positive. This is in sharp distinction to previous approaches.

Returning to FIG. 1, filtered signals 24 and 25 are applied to cross correlation unit 13 which takes the sum of the products of the components for an array of pixels surrounding the pixel being corrected. For example, the sum can be taken over nine pixels in a 3×3 array centered on the one currently being corrected. The product and sum operation can be performed digitally in standard fashion. Alternatively analog log and antilog devices can perform the multiplication, with the summation performed by a low pass filter which effectively averages the product signals. The same type of digital or analog circuitry can be used for 12, the autocorrelation unit. Here a square law device and low pass filter can be used.

Ratio structure 14 takes the ratio or quotient of signal 18 to signal 17. This division operation can again be performed digitally, or, alternatively, with log and antilog devices to perform the division, which represents the antilog of the difference of the logs of the signals. Thus signal 19 represents the desired gain factor C, indicating the amount of high frequency luminance information to be added to the color difference signal. The incident luminance signal is high pass filtered by 11, providing a signal $Y_h$ in the 1.0 to 4.0 MHz range. This is applied to controlled gain structure 21 which carriers the multiplier or gain factor.

Signal 19, C, controls the gain of controlled multiplier 26 to provide a controlled amount of $Y_h$, 20, to summer 23, forming the final improved red signal R. Y and (R-Y) are added in summer 15 to provide signal 21 which represents the conventional red signal having reduced edge response for colors. When 21 is added to 22 and 23, we form the improved signal R. As previously indicated, this same operation is performed with each of the color difference signals to provide complete high resolution color. As a convenience, once two of the color difference signals are modified as in FIG. 1 to provide high resolution, the third color difference signal can be derived from the first two using a weighted sum.

Studies are presently underway for high definition color television systems and receivers. These will require high definition color-signals as well. One approach is to include the system of FIG. 1 in each receiver, where the band pass filter 10 are based on the new available color-difference bandwidth and the high pass filter 11 is based on the new available luminance bandwidth. In this case, as before, the mid-frequency regions of R-Y and Y are used to "infer" the amount of high frequency luminance signal that should be added to each color difference signal.

However, with a new system, this can be improved. The correlation can take place at the transmitter, where it will be more accurate and not be subject to noise. Filters 10 of FIG. 1 can each have a range starting with the bandwidth of the color-difference signal and ending with the bandwidth of the luminance signal. In other words, if 1 MHz is the chrominance bandwidth, and 6 MHz the luminance bandwidth, these filters 10 would be from 1.0–6.0 MHz. The transmitter portion would only include blocks 10, 12, 13, and 14 of FIG. 1, going from the original wideband Y and R-Y signals to produce accurate control signal 19.

Figure 2:
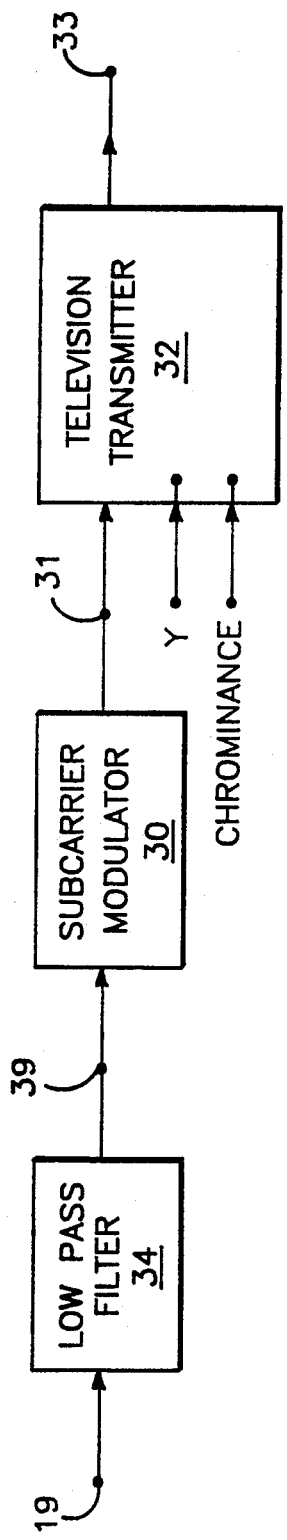
FIG. 2 is a block diagram of an embodiment of the invention where the control signal is transmitted.

In FIG. 2, this accurate control signal 19 is filtered in 34 so that it can fit into the television channel. This filtering is especially important in compatible HDTV systems where the spectrum is very crowded. The low pass filter 34 will limit the rate at which different transitions can occur, and still be accurately reproduced. For most scenes, the filtering will not affect the performance. The filtered signal 34 can be used to modulate a subcarrier in the TV channel. Alternatives for subcarriers are given in a special issue of the *IEEE Transactions on Broadcasting* of December 1987, Vol. BC-33 entitled "Special Issue on High Definition Television." One possibility is an interleaved subcarrier at around 3.1 MHz which is phase alternated on each field to minimize the visibility on existing color receivers. Another is the use of quadrature modulation of the main carrier.

This subcarrier modulation takes place in 30 to form subcarrier signal 31 which is added to the Y and chrominance signals in a television transmitter 32, or alternatively a cable or video tape system, producing composite transmitted signal 33.

Figure 3:
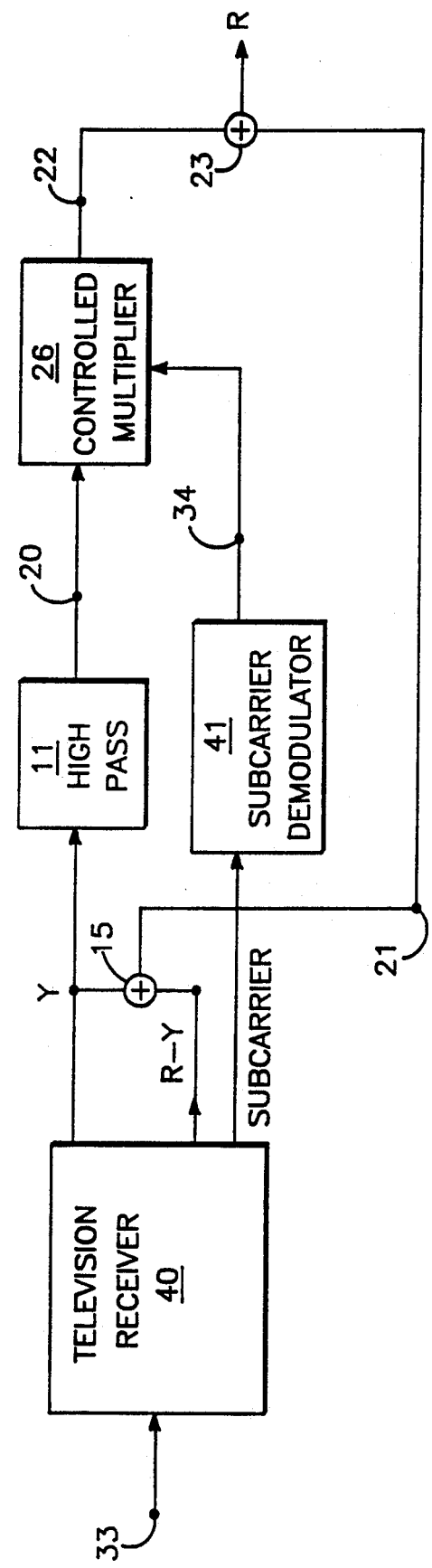
FIG. 3 is a block diagram of an embodiment of the invention where the control signal is received.

At the high definition television receiver 40 shown in FIG. 3, signal 33 is received and demodulated into luminance, color difference and subcarrier signals. Subcarrier demodulator 41 reproduces filtered control signal 34 which is then used, as before, to control the amount of added high frequency luminance signal. Luminance signal Y is passed through high pass filter 11 to provide signals 20, representing the high frequencies of the color difference signals. High-frequency signal 20 is passed through controlled multiplier 26 where 34 determines the amount and polarity of the high frequencies 22. Signals Y and R-Y are again added in 15 to form signal 21, the color signal with limited edge resolution. Signal 21 is added to 22 in adder 23 to form the high resolution R signal. This will have greater fidelity since the correlation, at the transmitter, took place with wideband signals.

What is claimed is:

1. In a method for enhancing the high frequency response of band-limited color difference signals using a luminance signal the steps of:
   deriving a control signal which minimizes the magnitude of the difference between a bandlimited portion of the color difference signal and a bandlimited portion of the luminance signal;
   filtering the luminance signal to derive a high-frequency luminance signal; and
   adding a controlled amount of high frequency luminance signal, determined by the control signal, to the color difference signal.

2. The method as described in claim 1 where the step of deriving a control signal includes the step of minimizing the mean square difference between the bandlimited color difference and luminance signals.

3. The method as described in claim 2 where the step of deriving a control signal which minimizes the mean square difference includes the step of taking the ratio of the cross-correlation of the bandlimited color difference and luminance signals to the autocorrelation of the bandlimited luminance signal.

4. Apparatus for enhancing the high frequency response of the color difference signals using a luminance signal comprising:
   filtering means for developing bandlimited color difference and luminance signals;
   means for deriving a control signal which minimizes the magnitude of the difference between the bandlimited color difference and luminance signals;
   filtering means for developing a high frequency luminance signal; and
   means for using the control signal to determine the amount of high-frequency luminance signal added to the color-difference signal.

5. Apparatus as described in claim 4 where the means for deriving the control signal includes means for minimizing the mean square difference between the bandlimited luminance and color difference signals.

6. Apparatus as described in claim 4 where the means for minimizing the mean square difference includes means for deriving the ratio of the cross-correlation of the bandlimited luminance and color difference signals to the autocorrelation of the bandlimited luminance signal.

7. In a method for transmitting reduced-bandwidth color information and restoring the high-frequencies at the receiver using the luminance information the steps of:
   deriving a control signal representing the amount of high-frequency luminance signal to be added to the reduced bandwidth color information; and
   encoding the controls signal into the transmitted signal.

8. The method as described in claim 7 where the step of deriving the control signal includes the steps of forming the cross-correlation of the high-frequency luminance and chrominance information and dividing it by the autocorrelation of the high-frequency luminance information.

9. In a method for increasing the resolution of received color television signals where the received signals include a wideband luminance signal, a reduced bandwidth color difference signal and a control signal indicating the amount of high-frequency luminance signal to be added to the reduced bandwidth color-difference signal the steps of
   filtering the luminance signal to form a high-frequency luminance signal; and
   controlling the amount of the high frequency luminance signal to be added to the color difference signal using the control signal.

10. Apparatus for increasing the resolution of received color television signals where the received signals include a wideband luminance signal, a reduced bandwidth color difference signal and a control signal indicating the amount of high-frequency luminance signal to be added to the reduced bandwidth color-difference signal comprising:
   filtering means for extracting the high frequency portion of the luminance signal; and
   means for controlling the amount of filtered high-frequency luminance signal added to the color difference signal using the control signals.

* * * * *